W. W. HUSE.
Curing Tobacco.
No. 37,509.
Patented Jan. 27, 1863.
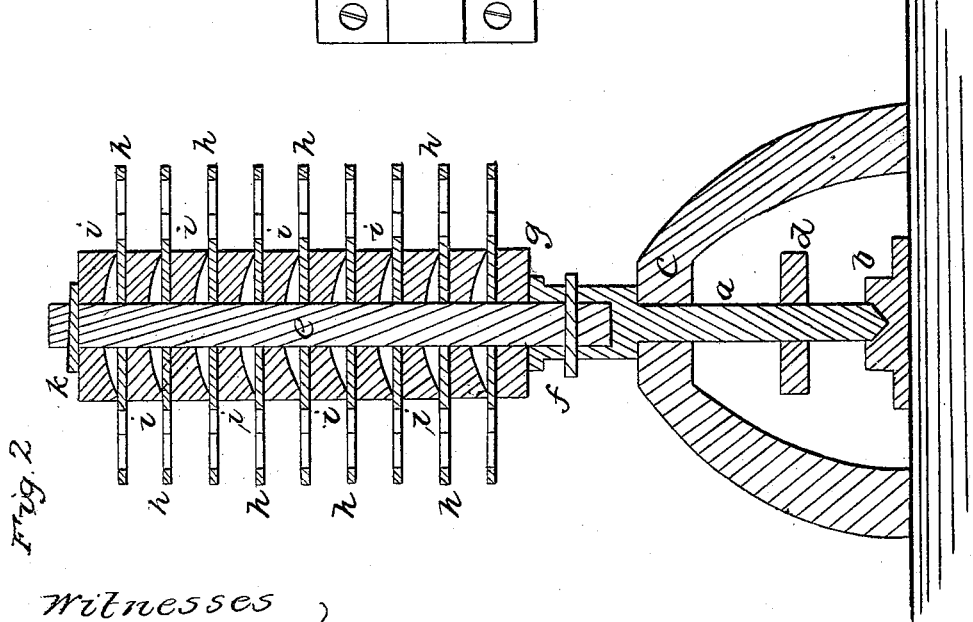

UNITED STATES PATENT OFFICE.

WILLIAM W. HUSE, OF BROOKLYN, NEW YORK.

IMPROVEMENT IN MACHINES FOR DRYING TOBACCO.

Specification forming part of Letters Patent No. 37,509, dated January 27, 1863.

*To all whom it may concern:*

Be it known that I, WILLIAM W. HUSE, of Brooklyn, Kings county, and State of New York, have invented a new and useful Improvement in Machinery for Drying Tobacco in the Leaf; and I do hereby declare that the following is a full, clear, and exact description thereof, reference being had to the accompanying drawings, making part of this specification, in which—

Figure 1 is a plan, and Fig. 2 a vertical section, of the said machinery.

The same letters indicate like parts in both figures.

The object of my said invention is to dry tobacco in the leaf more rapidly than by any other known mode; and my said invention consists in combining with a rotating spindle a series of clamps, between which the butt-ends of the stems of the leaves are clamped all around and held, with the leaves projecting out radially from the said spindle, so that when rotated at a high velocity the moisture shall be driven out by centrifugal action.

In the accompanying drawings, $a$ represents a vertical shaft, with the journal at the lower end resting in a step, $b$, and a journal near the upper end fitted to a suitable box, $c$. Between the two journals this shaft is provided with a pulley, $d$, to receive a belt from some motor. The upper end of the shaft is formed with a socket to receive the lower end of a vertical spindle, $e$, so that it can be readily taken out and inserted and there secured by a key, $f$, or other suitable means. From the shoulder $g$ to the upper end this spindle is cylindrical, to receive a series of circular shelves, $h$, and interposed clamping-plates or washers $i$. A shelf, $h$, is placed on the spindle and resting on the shoulder $g$. Tobacco-leaves in the wet or moist state are laid all around on this shelf, arranged radially with the butt of the stems toward and near to the spindle, and over these stems is placed one of the clamping-plates or washers $i$, so that the thicker part of the stems shall be received within the concave part, while the edge of the washer clamps and grips them where they are of less thickness. Over this clamping-plate or washer a second shelf, $h$, is placed and covered in like manner with tobacco-leaves, which are there clamped by a second plate or washer, and so on to the top, and the whole series forced down and secured by a key or wedge, $k$, or other suitable fastening. The leaves having been so arranged and clamped, a rotary motion at a high velocity is then given, which causes the moisture in the leaves to travel out and be discharged by centrifugal force.

I prefer to make the shelves $h$ of sheet metal, cut out to form a central hub, with arms extending to an outer rim; or they may be made of wire, or, if desired, they may be made without any other opening than the central hole for the spindle; but I wish it to be distinctly understood that the shelves may be dispensed with altogether, although the best results will be obtained by using shelves, as they facilitate the operation of charging the machine with tobacco.

The form of clamps above described and represented I have found to answer a good purpose; but I do not wish to be understood as limiting my claim of invention to such form, as the same end may be obtained by equivalent means.

What I claim as my invention, and desire to secure by Letters Patent, is—

1. The combination of the series of clamps with the rotating spindle, substantially as described, for securing the stems of tobacco-leaves to the spindle, that they may be dried by centrifugal action, as set forth.

2. The series of shelves on which to place the tobacco, substantially as described, in combination with the series of clamps and the spindle, substantially as described.

WILLIAM W. HUSE.

Witnesses:
 WM. H. BISHOP,
 A. DE LACY.